US011061598B2

(12) United States Patent
Bazarsky et al.

(10) Patent No.: US 11,061,598 B2
(45) Date of Patent: Jul. 13, 2021

(54) OPTIMIZED HANDLING OF MULTIPLE COPIES IN STORAGE MANAGEMENT

(71) Applicant: Western Digital Technologies, Inc., San Jose, CA (US)

(72) Inventors: Alexander Bazarsky, Holon (IL); Tomer Eliash, Kfar Saba (IL); Yuval Grossman, Kiryat Ono (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 277 days.

(21) Appl. No.: 16/363,935

(22) Filed: Mar. 25, 2019

(65) Prior Publication Data

US 2020/0310669 A1 Oct. 1, 2020

(51) Int. Cl.
*G06F 3/06* (2006.01)
*G06F 12/0802* (2016.01)

(52) U.S. Cl.
CPC ............ *G06F 3/0647* (2013.01); *G06F 3/064* (2013.01); *G06F 3/0604* (2013.01); *G06F 3/0679* (2013.01); *G06F 12/0802* (2013.01)

(58) Field of Classification Search
CPC ............... G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 17/00–40; G06F 21/00–88; G06F 2003/0691–0698;

(Continued)

(56) References Cited

U.S. PATENT DOCUMENTS 4,914,577 A * 4/1990 Stewart ............... G06F 12/1036
711/207
5,809,515 A * 9/1998 Kaki ..................... G06F 3/0601
711/103

(Continued)

OTHER PUBLICATIONS

Definition flash memory; Margaret Rouse et al.; Feb. 12, 2018; retrieved from https://web.archive.org/web/20180212012815/https://searchstorage.techtarget.com/definition/flash-memory on Feb. 19, 2021 (Year: 2018).*

(Continued)

*Primary Examiner* — Daniel C. Chappell
(74) *Attorney, Agent, or Firm* — Patterson & Sheridan, LLP; Steven H. Versteeg (57) ABSTRACT

The present disclosure generally relates to relocating data in a storage device and updating a compressed logical to physical (L2P) table in response without invalidating cache entries of the L2P table. After relocating data from a first memory block associated with a first physical address to a second memory block associated with a second physical address, a version indicator of a cache entry corresponding to the first physical address in the L2P table is incremented. One or more cache entries are then added to the L2P table associating the relocated data to the second physical block without invaliding the cache entry corresponding to the first physical address. When a command to read or write the relocated data is received, the storage device searches the L2P table and reads the data from either the first memory block or the second memory block.

20 Claims, 7 Drawing Sheets

(58) Field of Classification Search
CPC .. G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G11C 7/00–24; G11C 11/00–5692; G11C 13/00–06; G11C 14/00–009; G11C 15/00–06; G11C 16/00–3495; G11C 17/00–18; G11C 2207/00–229; G11C 2216/00–30

See application file for complete search history.

(56) References Cited

U.S. PATENT DOCUMENTS

| | | | | |
|---|---|---|---|---|
| 5,822,781 | A * | 10/1998 | Wells | G06F 3/0625 711/171 |
| 5,900,016 | A * | 5/1999 | Ghosh | G06F 12/0804 711/143 |
| 6,377,500 | B1 * | 4/2002 | Fujimoto | G06F 12/0246 365/230.01 |
| 7,061,812 | B2 * | 6/2006 | Shinagawa | G06F 12/0246 365/185.29 |
| 7,441,090 | B2 * | 10/2008 | Estakhri | G06F 3/0613 711/159 |
| 9,075,528 | B2 * | 7/2015 | Huang | G06F 3/067 |
| 9,170,938 | B1 * | 10/2015 | Walsh | G06F 3/0688 |
| 9,378,131 | B2 * | 6/2016 | Kurotsuchi | G06F 12/0246 |
| 9,489,296 | B1 * | 11/2016 | Tomlin | G06F 12/0253 |
| 9,710,378 | B2 * | 7/2017 | Fujita | G06F 3/065 |
| 10,019,353 | B2 * | 7/2018 | Orme | G06F 11/108 |
| 10,037,168 | B2 * | 7/2018 | Miura | G06F 12/1009 |
| 10,095,423 | B2 * | 10/2018 | Fukutomi | G06F 3/0635 |
| 10,248,322 | B2 * | 4/2019 | Kanno | G06F 3/061 |
| 2004/0065744 | A1 * | 4/2004 | Shiraishi | G11C 16/3418 235/492 |
| 2005/0144358 | A1 * | 6/2005 | Conley | G06F 12/0246 711/103 |
| 2006/0020747 | A1 * | 1/2006 | Estakhri | G06F 3/0679 711/103 |
| 2007/0028034 | A1 * | 2/2007 | Nishihara | G06F 12/0804 711/103 |
| 2008/0109592 | A1 * | 5/2008 | Karamcheti | G06F 12/10 711/103 |
| 2008/0177937 | A1 * | 7/2008 | Nishihara | G06F 12/0246 711/103 |
| 2010/0030999 | A1 * | 2/2010 | Hinz | G06F 3/0616 711/206 |
| 2010/0115189 | A1 * | 5/2010 | Lin | G06F 12/0246 711/103 |
| 2010/0332730 | A1 * | 12/2010 | Royer, Jr. | G06F 12/0246 711/103 |
| 2012/0173795 | A1 * | 7/2012 | Schuette | G06F 12/0246 711/103 |
| 2012/0324153 | A1 * | 12/2012 | Maheshwari | G06F 3/0688 711/103 |
| 2013/0198439 | A1 * | 8/2013 | Kurotsuchi | G06F 12/0246 711/103 |
| 2014/0101369 | A1 * | 4/2014 | Tomlin | G06F 12/0246 711/103 |
| 2014/0258588 | A1 * | 9/2014 | Tomlin | G06F 12/0246 711/103 |
| 2014/0281145 | A1 * | 9/2014 | Tomlin | G06F 3/0685 711/103 |
| 2015/0356029 | A1 * | 12/2015 | Craske | G06F 12/1009 711/163 |
| 2016/0210241 | A1 * | 7/2016 | Jacobs | G06F 12/0246 |
| 2017/0371804 | A1 * | 12/2017 | Li | G06F 3/0611 |

OTHER PUBLICATIONS

W. J. Dally, "A fast translation method for paging on top of segmentation," in IEEE Transactions on Computers, vol. 41, No. 2, pp. 247-250, Feb. 1992 (Year: 1992).*

C. Wu and T. Kuo, "An Adaptive Two-Level Management for the Flash Translation Layer in Embedded Systems," 2006 IEEE/ACM International Conference on Computer Aided Design, 2006, pp. 601-606 (Year: 2006).*

X. Wang, H. Liu, X. Liao, H. Jin and Y. Zhang, "TLB Coalescing for Multi-Grained Page Migration in Hybrid Memory Systems," in IEEE Access, vol. 8, pp. 66304-66314, 2020 (Year: 2020).*

M. Cai, C. C. Coats and J. Huang, "HOOP: Efficient Hardware-Assisted Out-of-Place Update for Non-Volatile Memory," 2020 ACM/IEEE 47th Annual International Symposium on Computer Architecture (ISCA), 2020, pp. 584-596 (Year: 2020).*

* cited by examiner

502 — SORT A VALIDITY COUNTER ARRAY BY A VALIDITY COUNT, WHEREIN THE VALIDITY COUNT IS A NUMBER OF VALID FLASH MEMORY UNITS IN A MEMORY BLOCK

504 — GROUP THE PLURALITY OF MEMORY BLOCKS BY VALIDITY COUNT INTO BUCKETS IN THE VALIDITY COUNTER ARRAY

506 — PRIORITIZE ONE OR MORE MEMORY BLOCKS FROM THE BUCKETS TO BE ERASED AND SCHEDULE THE ONE OR MORE MEMORY BLOCKS FOR ERASURE IN ORDER OF PRIORITY, WHEREIN THE ORDER OF PRIORITY FROM HIGH TO LOW IS AS FOLLOWS:

508 — BUCKETS HAVING A LOW VALIDITY COUNT ARE PRIORITIZED ABOVE BUCKETS HAVING A HIGH VALIDITY COUNT

510 — MEMORY BLOCKS WITHIN A BUCKET NOT LOGGED TO DATA IN THE COMPRESSED L2P CACHE ARE PRIORITIZED ABOVE MEMORY BLOCKS THAT ARE LOGGED TO DATA IN THE COMPRESSED L2P CACHE

512 — MEMORY BLOCKS WITHIN A BUCKET NOT RECENTLY READ IN THE COMPRESSED L2P CACHE ARE PRIORITIZED ABOVE MEMORY BLOCKS THAT HAVE BEEN RECENTLY READ IN THE COMPRESSED L2P CACHE

OPTIMIZED HANDLING OF MULTIPLE COPIES IN STORAGE MANAGEMENT

BACKGROUND OF THE DISCLOSURE

Field of the Disclosure

Embodiments of the present disclosure generally relate to storage devices, such as solid state drives (SSDs).

Description of the Related Art

SSDs may be used as storage devices to achieve better-quality read and device performance. For example, SSDs may exhibit lower latency, particularly for random reads and writes, than hard disk drives (HDDs). This may allow greater throughput for random reads from and random writes to a SSD compared to a HDD. Additionally, SSDs may utilize multiple, parallel data channels to read from and write to memory devices, which may result in high sequential read and write speeds.

However, attaining higher device performance may require implementing complex management schemes and operations. One such management operation utilized to increase device performance comprises relocating data to and from memory blocks in a flash memory device. Relocating data may be advantageous, such as for enhancing wear levelling and data reclaiming, and may save data from being lost, such as during weak and hard memory failures. However, data relocation may result performance degradation.

To help support such complex management operations, management tables may be utilized, such as logical to physical tables. Logical to physical (L2P) tables are tables which store logical to physical address mapping to identify a location of user data in a physical entity, such as a flash memory device. Each time data is relocated, cache entries corresponding to the relocated data in the L2P tables may be invalidated, and new entries may be added. In response, cache coherency failures may arise and the L2P table may grow in size, reducing read performance and disrupting host operations.

Therefore, there is a need to provide a method of operating a storage device with increased read performance while minimizing cache coherency failures and host operation disruptions.

SUMMARY OF THE DISCLOSURE

The present disclosure generally relates to relocating data in a storage device and updating a compressed logical to physical (L2P) table in response without invalidating cache entries of the L2P table. After relocating data from a first memory block associated with a first physical address to a second memory block associated with a second physical address, a version indicator of a cache entry corresponding to the first physical address in the L2P table is incremented. One or more cache entries are then added to the L2P table associating the relocated data to the second physical block without invaliding the cache entry corresponding to the first physical address. When a command to read or write the relocated data is received, the storage device searches the L2P table and reads the data from either the first memory block or the second memory block.

In one embodiment, a method of operating a storage device having a plurality of memory blocks comprises relocating data stored in a first memory block to a second memory block, receiving a request to read the data, reading a logical to physical table to determine which memory block of the plurality of memory blocks the data is stored in, and reading the data from either the first memory block or the second memory block. A controller of the storage device is capable of reading the first memory block and the second memory block after relocating the data.

In another embodiment, a method of operating a storage device comprises relocating data from a first memory block associated with a first physical address to a second memory block associated with a second physical address. The first physical address is logged in a first cache entry in a compressed logical to physical table. The method further comprises incrementing a version indicator of the first cache entry in the compressed logical to physical table, adding one or more updated cache entries to the compressed logical to physical table in response to relocating the data to the second physical address, searching the compressed logical to physical table to determine where the data is located, reading the first cache entry before reading the one or more updated cache entries, and reading the data from the first physical address.

In one embodiment, a storage device comprises a plurality of memory blocks. Each memory block of the plurality of memory blocks comprises flash memory units. The storage device further comprises a controller coupled to the plurality of memory blocks. The controller is configured to store a compressed logical to physical table. The compressed logical to physical table logs location of data to one or more of the plurality of memory blocks. The controller is further configured to sort a validity counter array by a validity count. The validity count is a number of valid flash memory units in a memory block. The controller is further configured to prioritize one or more memory blocks from the plurality of memory blocks to be erased. Memory blocks having a low validity count are prioritized above memory blocks having a high validity count. Memory blocks not logged to data in the compressed logical to physical table are prioritized above memory blocks that are logged to data in the compressed logical to physical table. The controller is further configured to schedule one or more memory blocks from the plurality of memory blocks to be erased in order of priority.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to relocating data in a storage device and updating a compressed logical to physical (L2P) table in response without invalidating cache entries of the L2P table. After relocating data from a first memory block associated with a first physical address to a second memory block associated with a second physical address, a version indicator of a cache entry corresponding to the first physical address in the L2P table is incremented. One or more cache entries are then added to the L2P table associating the relocated data to the second physical block without invaliding the cache entry corresponding to the first physical address. When a command to read or write the relocated data is received, the storage device searches the L2P table and reads the data from either the first memory block or the second memory block.

Figure 1:
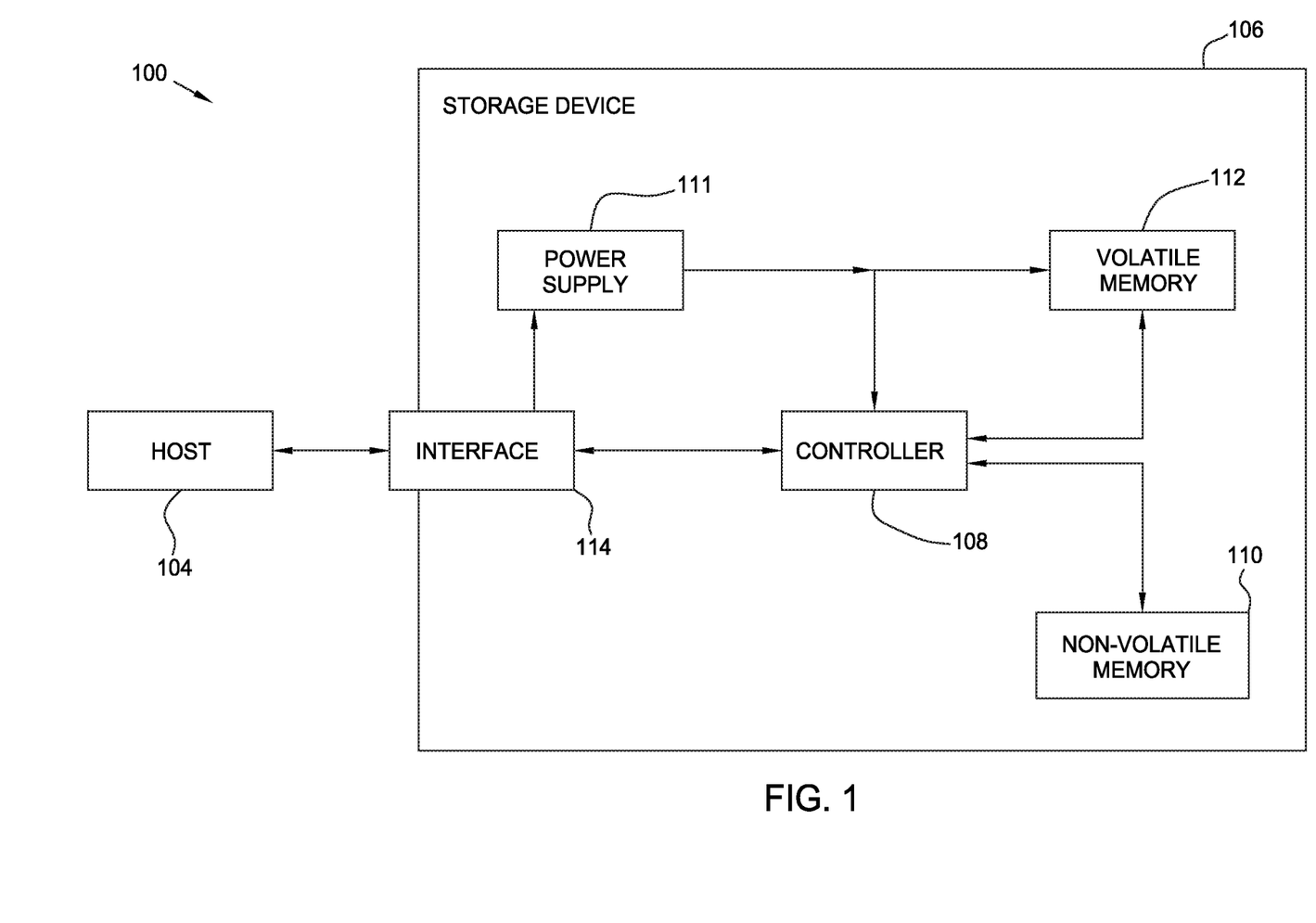
FIG. 1 is a schematic block diagram illustrating a storage system having a host device and a storage device, according to one embodiment.

FIG. 1 is a schematic block diagram illustrating a storage system 100 in which a storage device 106 may function as the storage device for a host device 104, in accordance with one or more techniques of this disclosure. For instance, the host device 104 may utilize non-volatile memory devices included in storage device 106 to store and retrieve data. In some examples, the storage system 100 may include a plurality of storage devices, such as the storage device 106, which may operate as a storage array. For instance, the storage system 100 may include a plurality of storages devices 106 configured as a redundant array of inexpensive/independent disks (RAID) that collectively function as a mass storage device for the host device 104.

The storage system 100 includes a host device 104 which may store and/or retrieve data to and/or from one or more storage devices, such as the storage device 106. As illustrated in FIG. 1, the host device 104 may communicate with the storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, and the like.

As illustrated in FIG. 1, the storage device 106 includes a controller 108, non-volatile memory 110 (NVM 110), a power supply 111, volatile memory 112, and an interface 114. In some examples, the storage device 106 may include additional components not shown in FIG. 1 for sake of clarity. For example, the storage device 106 may include a printed board (PB) to which components of the storage device 106 are mechanically attached and which includes electrically conductive traces that electrically interconnect components of the storage device 106, or the like. In some examples, the physical dimensions and connector configurations of the storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the storage device 106 may be directly coupled (e.g., directly soldered) to a motherboard of the host device 104.

The interface 114 of the storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), or the like. The electrical connection of the interface 114 (e.g., the data bus, the control bus, or both) is electrically connected to the controller 108, providing electrical connection between the host device 104 and the controller 108, allowing data to be exchanged between the host device 104 and the controller 108. In some examples, the electrical connection of the interface 114 may also permit the storage device 106 to receive power from the host device 104. For example, as illustrated in FIG. 1, the power supply 111 may receive power from the host device 104 via the interface 114.

The storage device 106 includes NVM 110, which may include a plurality of memory devices. NVM 110 may be configured to store and/or retrieve data. For instance, a memory device of NVM 110 may receive data and a message from the controller 108 that instructs the memory device to store the data. Similarly, the memory device of NVM 110 may receive a message from the controller 108 that instructs the memory device to retrieve data. In some examples, each of the memory devices may be referred to as a die. In some examples, a single physical chip may include a plurality of dies (i.e., a plurality of memory devices). In some examples, each memory devices may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory device of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

NVM 110 may comprise one or more flash memory devices. Flash memory devices may include NAND and NOR based flash memory devices, and may store data based on a charge contained in a floating gate of a transistor for each flash memory cell. In some flash memory devices, such as NAND memory devices, the flash memory device may be divided into a plurality of blocks which may divided into a plurality of pages. Each block may include 128 KB of data, 256 KB of data, 2 MB of data, 8 MB of data, etc. In some instances, each page may include 1 kilobyte (KB) of data, 4 KB of data, 8 KB of data, etc. Each page may comprise zero or more flash memory units (FMUs). In some instances, each FMU may include 1 kilobyte (KB) of data, 4 KB of data, 8 KB of data, etc. The controller 108 may write data to and read data from the flash memory devices at the FMU level and erase data from the flash memory devices at the block level.

The storage device 106 includes a power supply 111, which may provide power to one or more components of the storage device 106. When operating in a standard mode, the power supply 111 may provide power to the one or more components using power provided by an external device, such as the host device 104. For instance, the power supply 111 may provide power to the one or more components using power received from the host device 104 via the interface 114. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The storage device 106 also includes volatile memory 112, which may be used by controller 108 to store information. Volatile memory 112 may be comprised of one or more volatile memory devices. In some examples, the controller 108 may use volatile memory 112 as a cache. For instance, the controller 108 may store cached information in volatile memory 112 until cached information is written to non-volatile memory 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3 L, LPDDR3, DDR4, and the like)).

The storage device 106 includes a controller 108, which may manage one or more operations of the storage device 106. For instance, the controller 108 may manage the reading of data from and/or the writing of data to NVM 110. In some embodiments, when the storage device 106 receives a write command from the host device 104, the controller 108 may initiate a data storage command to store data to NVM 110 and monitor the progress of the data storage command. The controller 108 may determine at least one operational characteristic of the storage system 100 and store the at least one operational characteristic to NVM 110.

Figure 2:
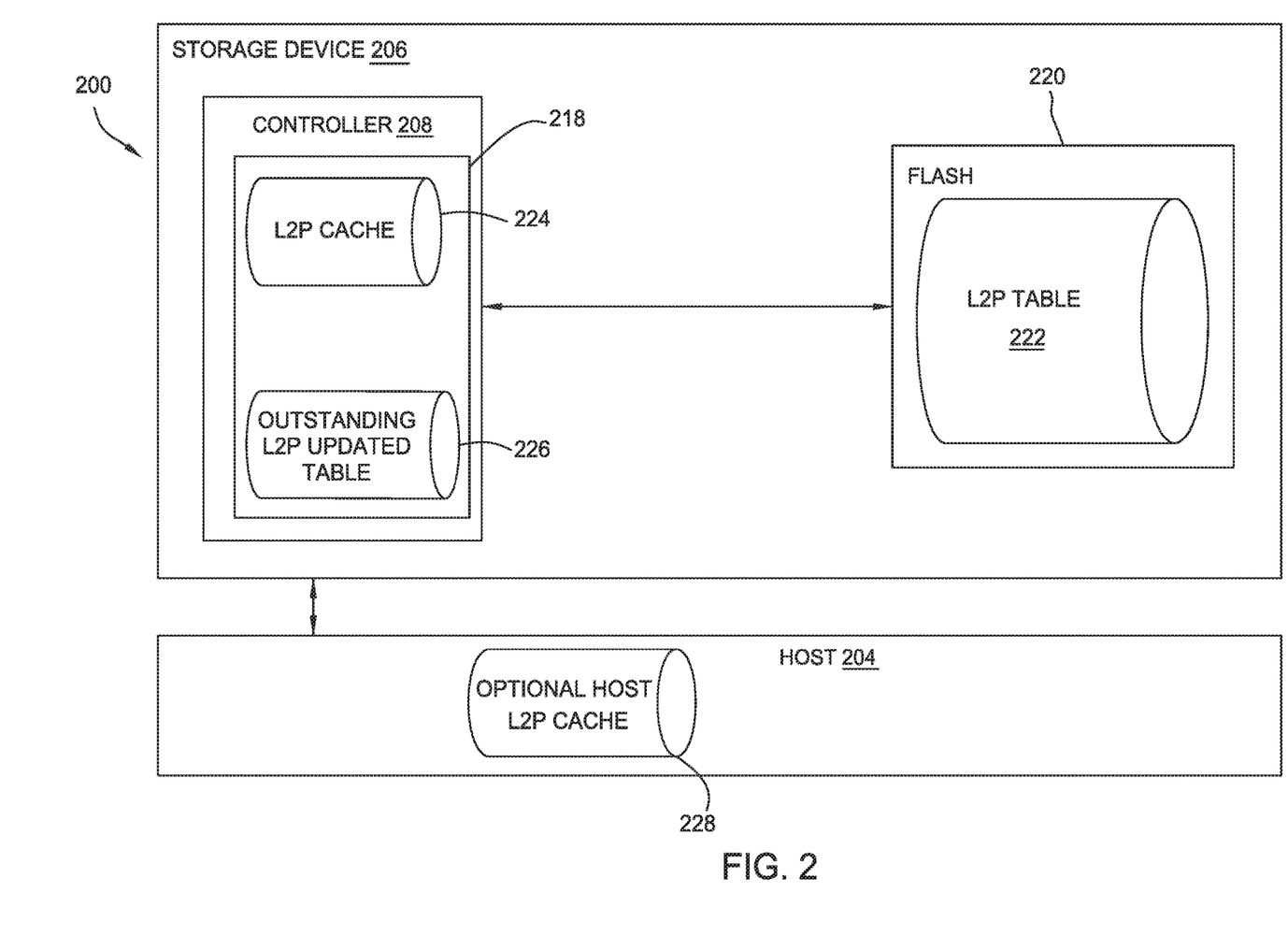
FIG. 2 is a schematic block diagram illustrating a storage system having a host device and a storage device, according to another embodiment.

FIG. 2 is a schematic block diagram illustrating a storage system 200 having a host device 204 and a storage device 206, according to another embodiment. The storage system 200 may be the storage system 100 having the host device 104 and the storage device 106 of FIG. 1.

Storage device 206 comprises a controller 208 and one or more flash memory devices 220. The controller 208 may be the controller 108 of FIG. 1. The flash memory device 220 may be the NVM 110 of FIG. 1. Each of the one or more flash memory devices 220 may include a plurality of blocks; each block may include a plurality of pages; each page may contain zero or more flash management units (FMUs); and each FMU may contain a plurality of bytes. As used herein, an FMU refers to an addressable unit of memory in a flash memory device 220. The flash memory device 220 stores a master logical-to-physical address translation (L2P) table 222, which converts a logical address to a physical address in the flash memory device 220 where data is stored. The physical address may correspond to one or more FMUs of a memory block.

During operation, the controller 208 may receive a read command or write request from the host device 204 and may determine where to store data included in the write request. The controller 208 may further determine to relocate data without receiving a command from the host device 204 to execute management operations. The read and write requests may include the data, a logical address, and/or a physical address. The controller 208 may determine which flash memory device of the one or more flash memory devices 220 to store the data. The controller 208 stores the data in the one or more flash memory devices 220 in a manner that the controller 208 can later associate the data with a logical address mapped to a physical address of the flash memory device 220. The controller 208 may then update the master L2P table 222 after storing the data. Since the master L2P table 222 tracks and logs all read, write, and erase data from the flash memory device 220, the master L2P table 222 can be quite large in size, which may result in more time needed to traverse the master L2P table 222.

To help reduce the time needed to search the master L2P table 222, the controller 208 comprises an L2P cache 224 and an outstanding updated operation L2P cache (OUO) 226 stored in the internal RAM 218 of the controller 208. The L2P cache 224 and the OUO cache 226 log and cache the most recently read or written data in the flash memory device 220. Since the internal RAM 218 has a limited size, the L2P cache 224 and the OUO cache 226 may be compressed in order to log more information. Compressing the L2P cache 224 and the OUO cache 226 permits for the caches to be larger, resulting in improved hit rates. A compressed L2P table condenses one or more logical addresses or physical addresses into one cache entry in the table. For example, a cache entry may hold recent logical addresses that have been read along with future logical addresses that may be read, such as sequential logical addresses.

Table 1 illustrates an example of a compressed L2P cache 224.

TABLE 1

| Entry number | First Logical Address | First Physical Address | Amount of valid concurrent entries | Version |
|---|---|---|---|---|
| 1 | 5 | 1000 | 50 | |

TABLE 1-continued

| Entry number | First Logical Address | First Physical Address | Amount of valid concurrent entries | Version |
|---|---|---|---|---|
| 2 | 200 | 1050 | 14 | |
| 3 | 110 | 1070 | 3 | |
| 4 | 500 | 100 | 100 | |
| ... | ... | ... | ... | |
| n | | | | |

The exemplary compressed L2P cache 224 of Table 1 comprises an entry number column, a column showing the first logical address of a range, a column showing the first physical address of a range, an amount of concurrent entries column, and a version indicator column. Physical addresses are associated with FMUs of memory blocks. The amount of concurrent entries is the number of logical address and physical addresses logged in the respective cache entry. For example, in the first cache entry having an entry number of 1, logical addresses 5-55 and physical addresses 1000-1050 are logged. If data corresponding to a logical address or physical address logged in a cache entry is relocated, the version indicator of that cache entry may be incremented. One or more entries may be added to the compressed L2P cache 224 or to the OUO cache 226 in response to relocating the data. The OUO cache 226 may be configured like the exemplary compressed L2P cache 224 of Table 1.

In one embodiment, the L2P cache 224 logs the most recently read or written data in the flash memory device 220 while the OUO cache 226 logs any updates or changes made to entries in the L2P cache 224, such as when the controller 208 relocates data. By utilizing the L2P cache 224 and the OUO cache 226, recently read and written data can be quickly searched in the L2P cache 224 and the OUO cache 226 without having to search the master L2P table 222, which reduces the overall time spend searching for a physical address of data. The entries and information logged in the L2P cache 224 and the OUO cache 226 may be written or flushed to the master L2P table 222 when management operations are performed. The L2P cache 224 and the OUO cache 226 may then be cleared in order to log new entries. Management operations are performed periodically, as updates to the master L2P table 222 may have along latency, and may be lower priority than host operations.

In some embodiments, the controller 208 reads or writes data to the one or more flash memory devices 220 in FMUs. In some storage devices, re-writing a single FMU of data to the one or more flash memory devices 220 may involve writing the FMU to a new physical location, updating (e.g., by a flash-translation layer) a mapping between the logical address and the new physical location of the FMU, and marking the old FMU as outdated. The master L2P table 222, the L2P cache 224, and/or the OUO cache 226 may be updated to log the changes of re-writing FMUs.

The host device 204 comprises an optional host L2P cache 228. The host device 204 may optionally log recently read or written data to the storage device 206 in the host L2P cache 228. The host device 204 may optionally traverse or search the host L2P cache 228 and send the physical address of data with a read or write command. If the physical address sent by the host device 204 from the host L2P cache 228 is coherent, the controller 208 may use that physical address and need not search the master L2P table 222 or the L2P cache 224. The OUO cache 226 may log any updates or changes made to entries in the host L2P cache 228.

Figure 3A:
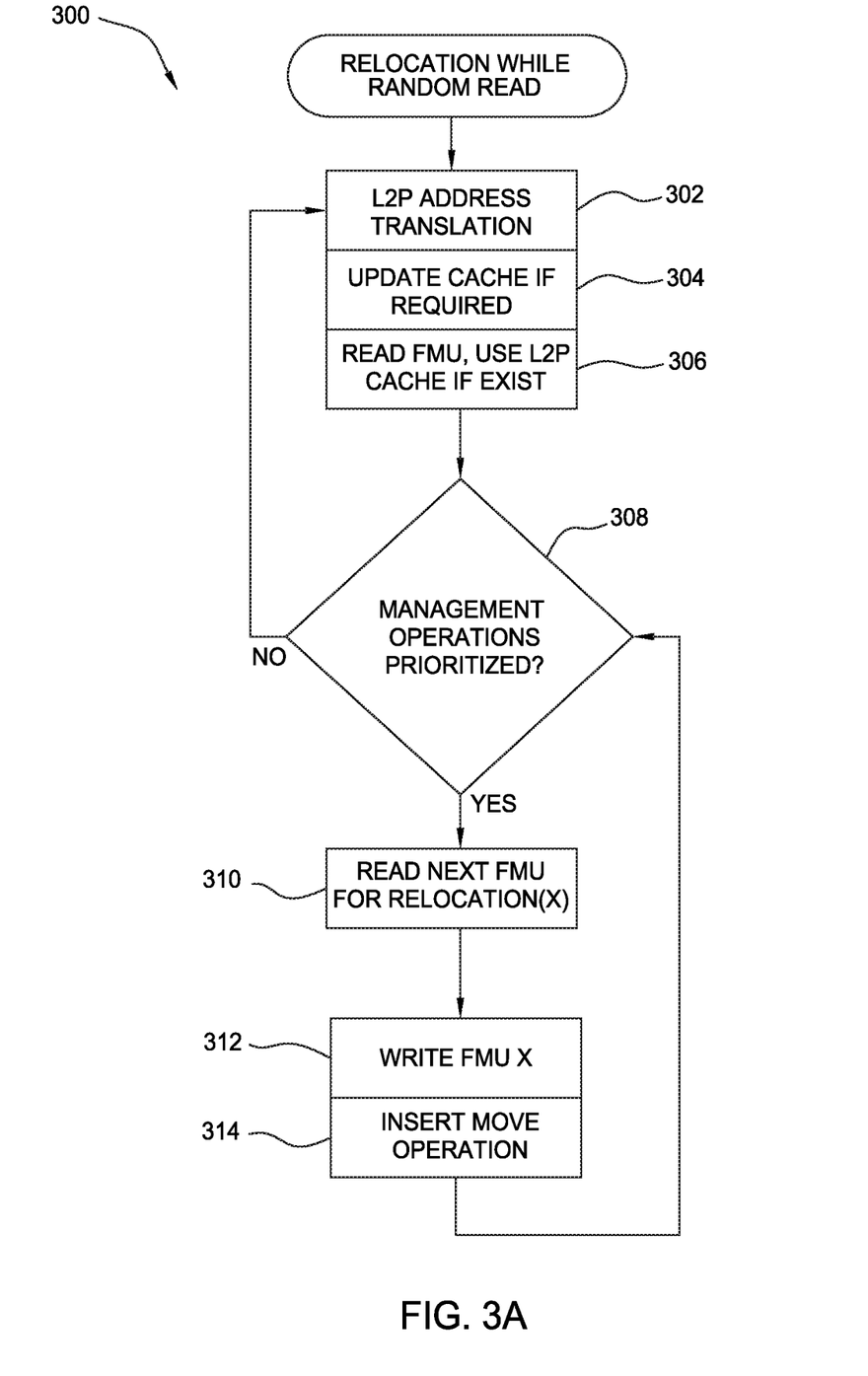
FIG. 3A illustrates a method of relocating data during host random read operations, according to one embodiment.
Figure 3B:
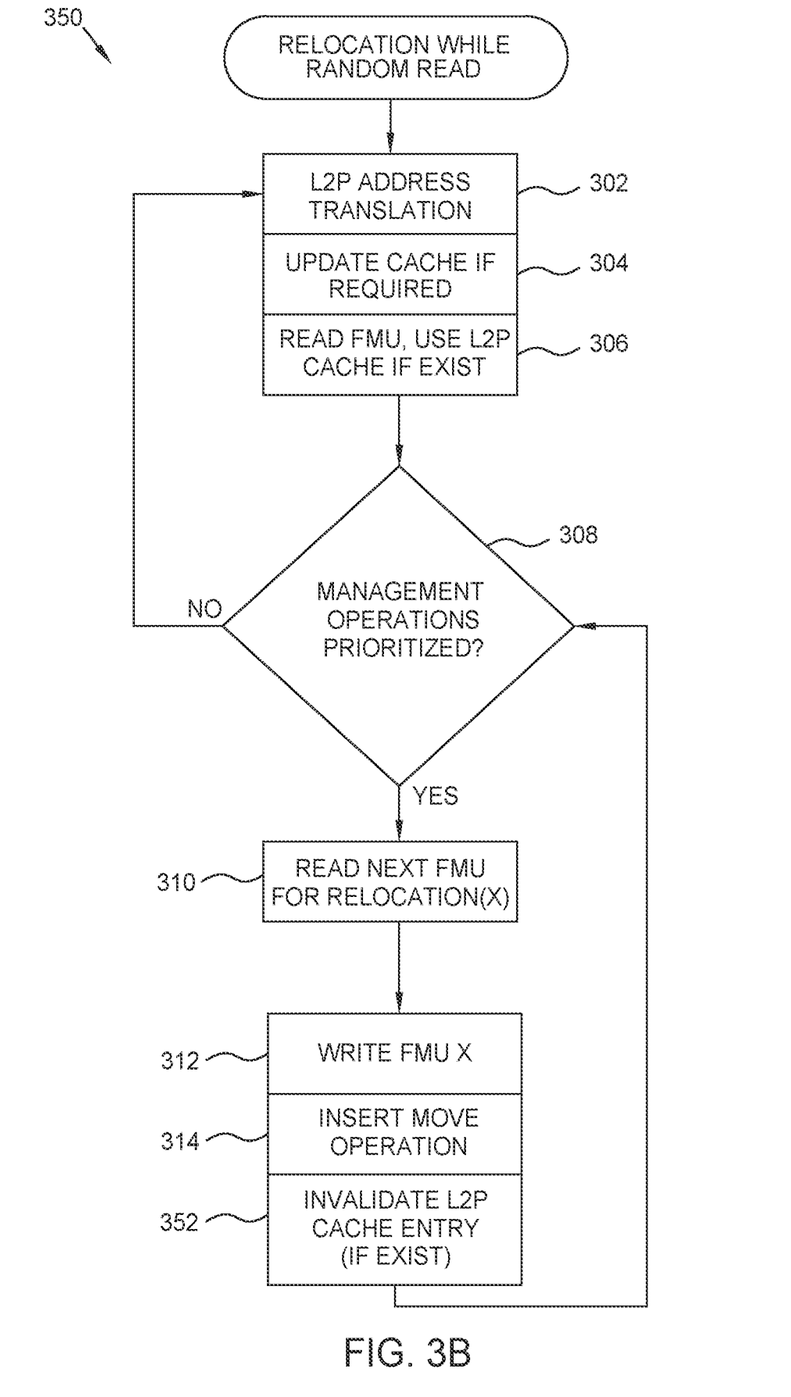
FIG. 3B illustrates a conventional method of relocating data during host random read operations for comparison purposes.

FIG. 3A illustrates a method 300 of relocating data during host random read operations, according to one embodiment. FIG. 3B illustrates a conventional method 350 of relocating data during host random read operations for comparison purposes. FIG. 3A may be used with the storage system 100 comprising a host device 104 and a storage device 106 of FIG. 1. FIG. 3A may further be used with the storage system 200 comprising a host device 204 and a storage device 206 of FIG. 2. The controller L2P caches may be the L2P cache 224 and/or the OUO cache 226 of FIG. 2.

In operation 302, a controller of a storage device receives a read request from a host device and translates a logical address associated with the data to be read to a physical address. The storage device may use a controller L2P cache to translate the logical address to the physical address. In operation 304, a cache entry in the controller L2P cache corresponding to the physical address of the data is updated if required. Each read of data may require the cache entry to be updated. For example, the cache entry may be updated to reflect how recently the data was read. The controller L2P cache may further be updated when data has been moved to a different physical address (i.e. moved to one or more FMUs in a new memory block). In operation 306, the FMU corresponding to the physical address of the data is read. The controller L2P cache may be used to determine the location of the FMU of the data.

In operation 308, the controller determines whether management operations are prioritized. Host operations, such as read requests, are prioritized above management operations. Thus, controller management operations, such as relocation of data, are interleaved between multiple read operations so that host operations are completed first. Controller management operations may be executed in the background over time in order to not reduce host latency. If management operations are not prioritized, method 300 proceeds back to operation 302 to continue executing host operations. If management operations are prioritized, method 300 proceeds to operation 310 to begin relocating data.

In operation 310, the controller reads the next FMUs for relocation. The next FMUs for relocation are FMUs currently available (i.e. empty or erased) for programming. In operation 312, the controller relocates the data by writing the data to the next FMUs read in operation 310. Relocating data from one memory block to another does not erase the data in the original memory block, but merely copies the data to a new memory block.

In operation 314, a move operation is inserted in the controller L2P cache in response to relocating the data. The move operation may comprise incrementing or decrementing a version indicator of cache entries in the controller L2P cache. Inserting the move operation in the controller L2P cache updates the controller L2P cache to show that the logical address associated with the data has been linked to a new physical address corresponding to the relocated FMUs storing the data. Inserting the move operations in the controller L2P cache adds one or more new cache entries to the controller L2P cache without invalidating any cache entries already in the controller L2P cache. For example, the cache entries in the controller L2P cache associating the physical address corresponding to the old or pre-relocated FMUs remain valid. Thus, the controller L2P cache holds multiple copies or locations of the relocated data in various cache entries, and an indication of the version of the cache entry. In one embodiment, the move operation is inserted into the L2P cache 224 of FIG. 2. In another embodiment, the move operation is inserted into the OUO cache 226 of FIG. 2. In yet another embodiment, the move operation is inserted into both the L2P cache 224 and the OUO cache 226 of FIG. 2.

The move operation inserted into the controller L2P cache updates the controller L2P cache to reflect the new physical address logged to the logical address of the data without invalidating data. As such, either the old cache entries corresponding to the pre-relocated FMUs or the new cache entries added in response to relocating the data may be read when a read request is received. For example, in operation 306, the controller may search the controller L2P cache for the logical address associated with the data. The controller may read either the old cache entries corresponding to the pre-relocated FMUs or the new cache entry added in response to relocating the data, since both cache entries will be logged to the logical address of the data. Thus, the controller may read the data from either the pre-relocated FMUs or the relocated FMUs, depending on which cache entry logged to the logical address of the data is read first. Furthermore, the controller is not required to search an OUO table comprised of relocation entries, as the original cache entry is still valid in the controller L2P cache. Therefore, processor read overhead may be reduced.

Conventional method 350 comprises at least one additional operation that method 300 does not. Following inserting a move operation in an L2P cache to update the L2P cache to show that the relocated data has been linked to a new physical address, conventional method 350 proceeds to operation 352. In operation 352, the controller invalidates a cache entry in the L2P cache corresponding to the pre-relocated physical address associated with the data. By invalidating the cache entry, the cache entry can no longer be read by the controller when searching the L2P cache. As such, the controller may be required to read an OUO table to find the re-location entry of the data, as the cache entry corresponding to the data will have been invalidated in the L2P cache. Additionally, if the L2P cache is a compressed L2P cache, the entire compressed cache entry will be invalidated.

Figure 4:
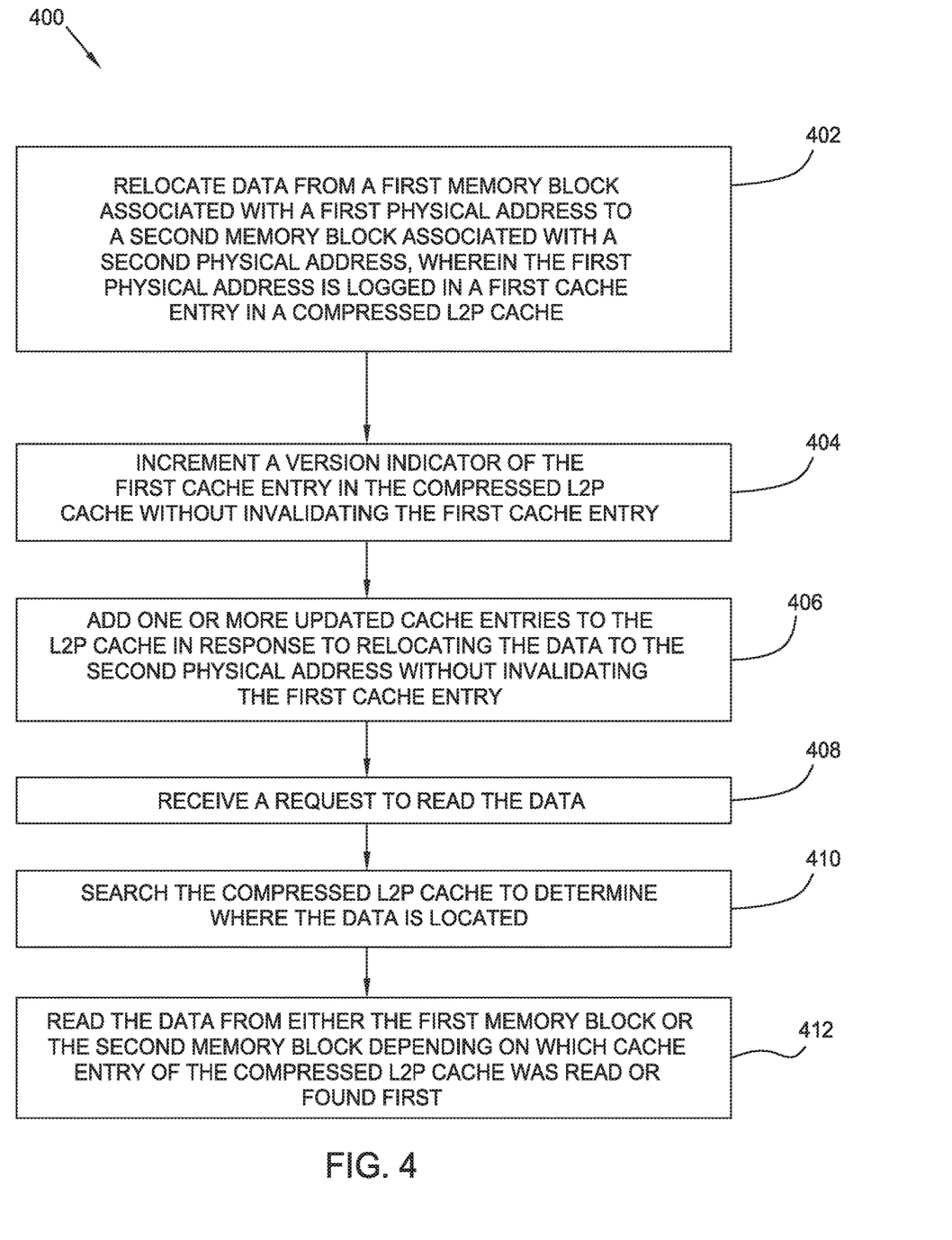
FIG. 4 illustrates a flowchart of a method of updating a L2P cache of a controller of a storage device when the controller relocates data, according to one embodiment.

FIG. 4 illustrates a flowchart of a method 400 of updating a L2P cache of a controller of a storage device when the controller relocates data, according to one embodiment. Method 400 may be used in combination with method 300. Method 400 may be utilized with the storage system 100 of FIG. 1 comprising a host device 104 and a storage device 106. Method 400 may further be utilized with the storage system 200 of FIG. 2 comprising a host device 204 and a storage device 206.

In operation 402 of method 400, data stored in a first memory block associated with a first physical address is relocated to a second memory block associated with a second physical address by a controller, such as controller 108 of FIG. 1 or controller 208 of FIG. 2. The first physical address is logged in a first cache entry in a compressed L2P cache stored in a controller, such as the L2P cache 224 and/or the OUO cache 226 of FIG. 2. The first physical address is associated with one or more FMUs in the first memory block and the second physical address is associated with one or more FMUs in the second memory block. Relocating the data from a first memory block to a second memory block does not erase or invalidate the data stored in the first memory block. Instead, the data is stored in both the first memory block and the second memory block until the first memory block is erased. Data is often relocated to new memory blocks to prepare the pre-relocation memory blocks for erasure, since memory blocks are erased in block units rather than by FMUs.

In operation 404, a version indicator of the first cache entry in the compressed logical to physical table is incremented without invalidating the first cache entry. The version indicator indicates that the cache entry is currently storing at least partially outdated information and that a newer version of the information may be available in the L2P cache.

In operation 406, one or more updated cache entries are added to the L2P cache in response to relocating the data to the second physical address. The one or more updated cache entries are added without invalidating the first cache entry. The one or more updated cache entries may be added to a controller L2P cache, such as L2P cache 224 of FIG. 2, and/or an outstanding update L2P table, such as OUO cache 226 of FIG. 2. The number of updated cache entries added to the L2P cache depends on the number of entries logged in the first cache entry. For example, if the first physical address fell in the middle of the physical address range of the first cache entry, the information of first cache entry may be broken down into three new cache entries, as described below with respect to Table 2.

In operation 408, the controller receives a request to read the relocated data from a host device. The host device may send a logical address associated to the data to the storage device with the request and/or a physical address associated to the data. Additionally, the controller may send a write request, which would be processed in the same manner in method 400.

In operation 410, the controller searches the L2P cache to determine where the data is located. The controller may search the L2P cache for the logical address associated with the data. Since the data has been relocated, the logical address associated with the data may be logged in multiple cache entries of the L2P cache. Thus, whichever cache entry corresponding to the logical address associated with the data that the controller reads first may be used to determine the location of the data, regardless of the version indicator of the cache entry.

In operation 412, the controller reads the data from either the first memory block or the second memory block. The controller may read the first memory block or second memory block depending on which cache entry of the L2P cache was read or found first in operation 410. For example, if the controller reads the first cache entry corresponding to the first physical address of the data, the controller may read the data in the first memory block. If the controller reads the one or more updated cache entries corresponding to the second physical address of the data, the controller may read the data in the second memory block.

An example is described using Table 2 to illustrate implementing method 400. Table 2 is a compressed L2P cache stored in a controller, such as L2P cache 224 of FIG. 2. In the example described below, assume data corresponding to logical address 10 is being relocated to FMUS corresponding to physical address 1100.

TABLE 2

| Entry number | First Logical Address | First Physical Address | Amount of valid concurrent entries | Version |
|---|---|---|---|---|
| 1 | 5 | 1000 | 50 | 1 |
| 2 | 200 | 1050 | 14 | |
| ... | ... | ... | ... | |
| n | 5 | 1000 | 4 | |
| n + 1 | 10 | 1100 | 1 | |
| n + 2 | 11 | 1006 | 44 | |

TABLE 2-continued

| Entry number | First Logical Address | First Physical Address | Amount of valid concurrent entries | Version |
| --- | --- | --- | --- | --- |

As shown in Table 2, logical address 10 is logged in the first cache entry (entry number 1). When the data corresponding to logical address 10 is relocated, the version indicator of the first cache entry is incremented, as described in operations 402 and 404 of method 400. Three new updated cache entries are then added to the compressed L2P cache, entry numbers n, n+1, and n+2, in operation 406 of method 400. The first updated cache entry (entry number n) logs logical addresses 5-9 to physical addresses 1000-1004, as demonstrated by the amount of valid concurrent entries. The second updated cache entry (entry number n+1) logs logical address 10 to the new relocation physical address 1100. The third updated cache entry (entry number n+2) logs the remaining logical address of the first cache entry (entry number 1). The third updated cache entry (entry number n+2) logs logical addresses 11-50 to physical addresses 1006-1050. In one embodiment, the updated cache entries are added to an outstanding update operation L2P table, such as OUO cache 226 of FIG. 2. In another embodiment, the updated cache entries are added to both an L2P cache, such as L2P cache 224, and an outstanding update operation L2P table, such as OUO cache 226.

The most current version of the data corresponding to logical address 10 is now relocated to FMUs of a memory block associated with physical address 1100. However, the data is still stored in a memory block associated with physical address 1005, although it may not be the most current version of the data. Thus, when the controller receives a request to read data associated with logical address 10 (operation 408 of method 400), the controller may search Table 2 for logical address 10, and may read either the first cache entry (entry number 1) or the second updated cache entry (entry number n+1) to determine where the data is located (operation 410 of method 400). Per operation 412 of method 400, the controller may then read the data from either the relocation memory block associated with physical address 1100 or the pre-relocated memory block associated with the physical address 1005.

The version indicator in the first cache entry (entry number 1) merely signals to the controller that at least a portion of the information logged in the first cache entry is outdated or is not the most current version available. While the information corresponding to logical address 10 and physical address 1005 in the first cache entry is not the most current version, the remaining information logged in the first cache entry is the most current (e.g. information associated with logical addresses 5-9 and 11-50). When the controller is ready to erase the memory block associated with the first physical address, the version indicator of the first cache entry (entry number 1) may be decremented. The version indicator may be decremented to 0. Decrementing the version indicator of the first cache entry may invalidate or remove the cache entry from the L2P cache.

Figure 5:
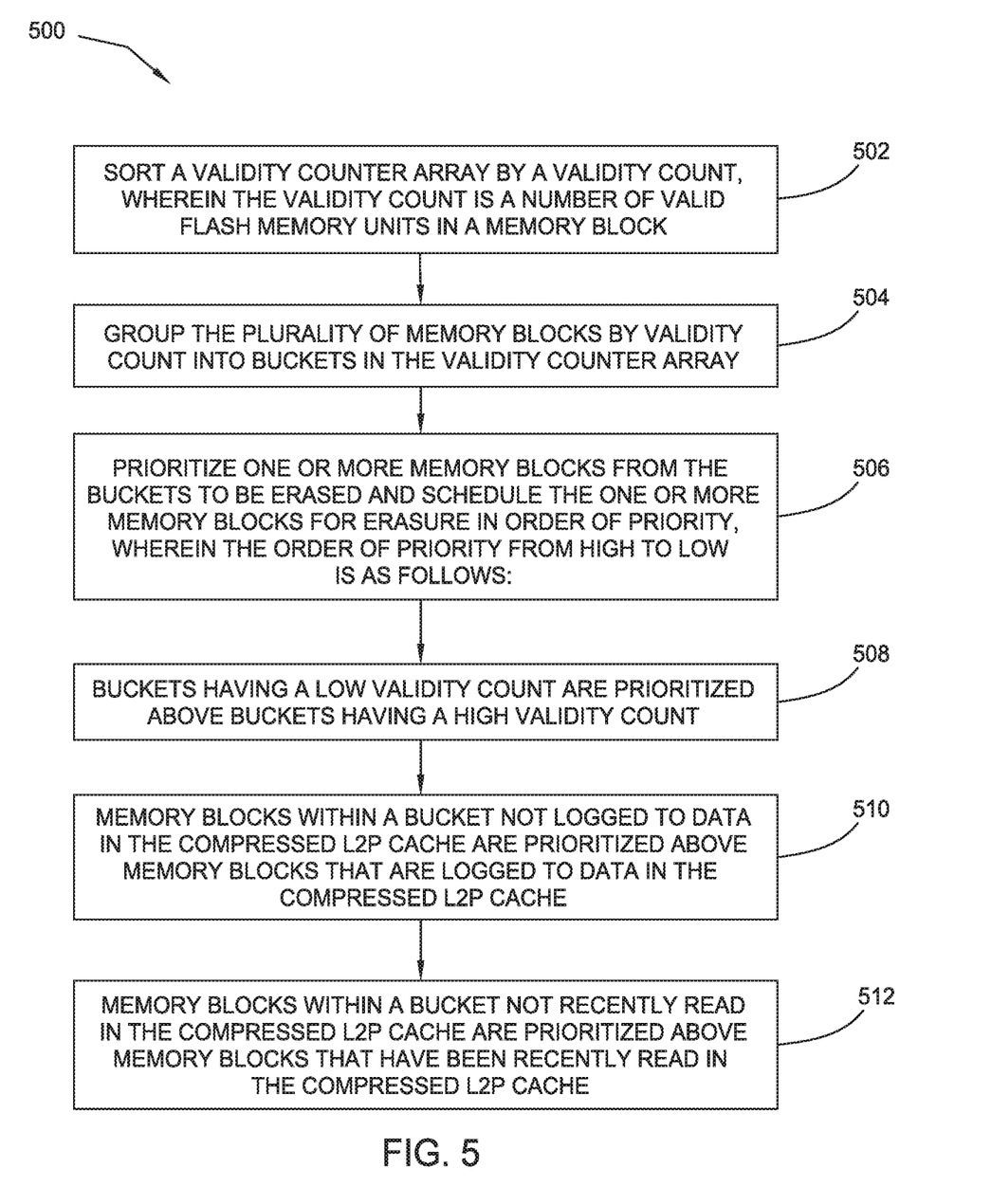
FIG. 5 illustrates a flowchart of a method of utilizing a compressed controller L2P cache to schedule memory blocks for erasure, according to one embodiment.

FIG. 5 illustrates a flowchart of a method 500 of utilizing a compressed L2P cache stored in a controller to schedule memory blocks for erasure, according to one embodiment. Method 500 may be used in combination with method 300 and/or method 400. For example, method 500 may be utilized after relocating data in operation 402 of method 400. Furthermore, method 500 may be utilized with the storage system 100 of FIG. 1 comprising a host device 104 and a storage device 106. Method 500 may further be utilized with the storage system 200 of FIG. 2 comprising a host device 204 and a storage device 206. Method 500 may be implemented with a controller of a storage device storing a compressed L2P table or cache that logs the location of data to FMUs of memory blocks, such as the L2P cache 224 and/or the OUO cache 226 of FIG. 2.

In operation 502, a validity counter array is sorted by a validity count. A validity count is a number of valid FMUs in a memory block. When data stored in FMUs in a first memory block has been relocated to a second memory block, the FMUs in the first memory block storing the data may be marked as invalid after the relocation. Marking FMUs invalid indicates the FMUs are ready to be erased. However, since the erasure of data is executed in block units, the FMUs marked as invalid cannot be erased until the memory block comprising the invalid FMUs is ready to be erased.

In operation 504, the memory blocks are grouped by validity count into buckets or units in the validity counter array. For example, if a memory block is comprised of 32 FMUs, the memory blocks would be grouped into 32 buckets based on the validity count of each memory block.

In operation 506, one or more of the memory blocks from the buckets are prioritized and scheduled for erasure in order of priority. Scheduling a memory block for erasure may include decrementing a version indicator of a cache entry in the compressed L2P cache. High priority blocks are schedules for erasure above low priority blocks. The order of priority is described in operations 508, 510, and 512.

In operation 508, buckets having a low validity count are prioritized above buckets having a high validity count. Thus, the bucket having the lowest validity count, or lowest number of valid FMUs, will be the highest priority bucket for erasure.

In operation 510, within each bucket, the memory blocks not logged to data in the compressed L2P cache are prioritized above memory blocks that are logged to data in the compressed L2P cache. Thus, within the highest priority bucket having the lowest validity count, memory blocks that are not logged in the L2P cache will be prioritized above memory blocks that are logged in the L2P cache.

In operation 512, within each bucket, the memory blocks not recently read in the compressed L2P cache are prioritized above memory blocks that have been recently read in the compressed L2P cache. Thus, within the highest priority bucket having the lowest validity count, after the memory blocks not logged in the L2P cache are schedule for erasure, the memory blocks that are logged in the L2P cache but have not been recently read will be schedule next. Memory blocks in a bucket that have been recently read in the L2P cache will have the lowest priority for erasure. The version indicator of cache entries in the L2P cache may be used to determine how recently a memory block was read. For example, if a version indicator of a cache entry indicates that the cache entry is storing some outdated information, the memory blocks corresponding to that cache entry may be prioritized above memory blocks corresponding to current cache entries.

Figure 6:
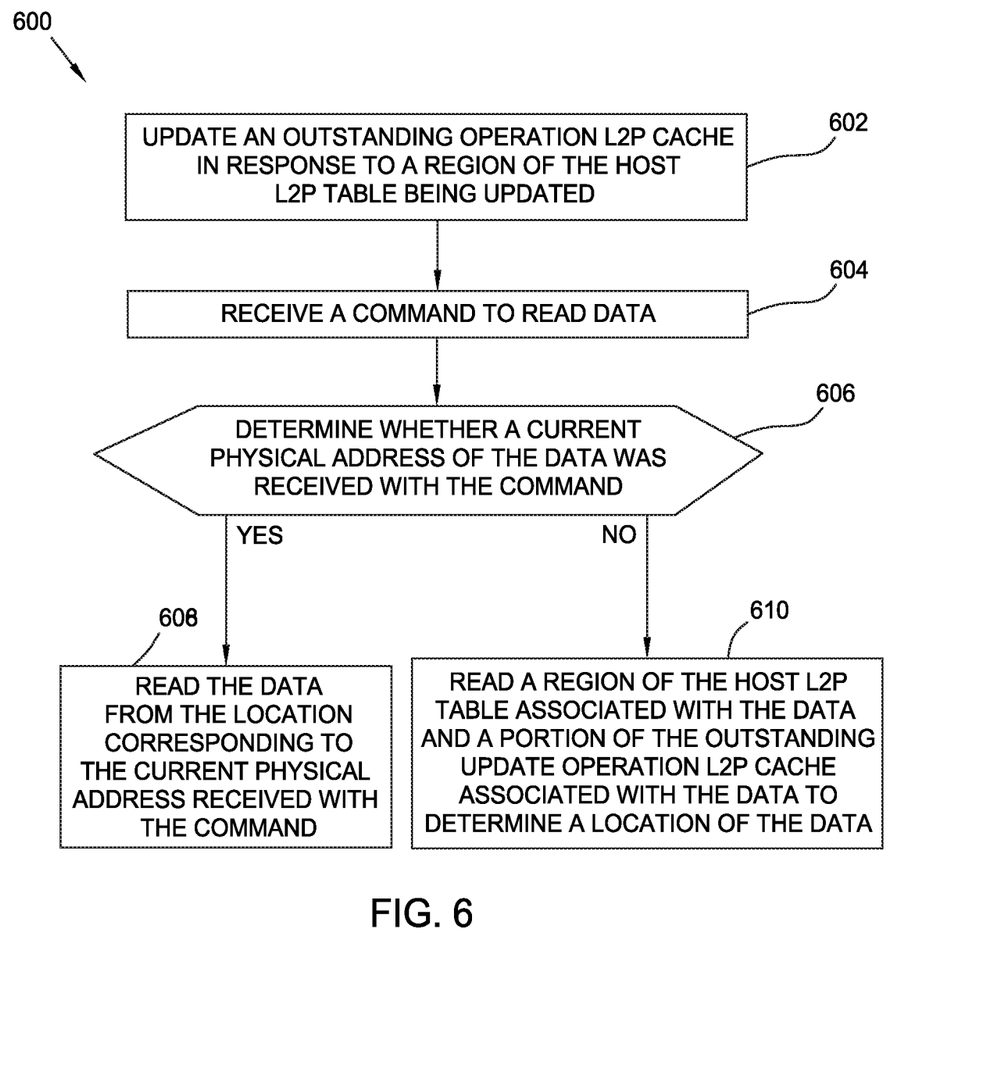
FIG. 6 illustrates a flowchart of a method of updating an outstanding update operation L2P cache of a controller of a storage device, according to one embodiment.

FIG. 6 illustrates a flowchart of a method 600 of updating an outstanding update operation L2P cache of a controller of a storage device, according to one embodiment. Method 600 may be used in combination with method 300, method 400 and/or method 500. Method 600 may be utilized with the storage system 100 of FIG. 1 comprising a host device 104 and a storage device 106. Method 600 may further be utilized with the storage system 200 of FIG. 2 comprising a host device 204 and a storage device 206. Method 600 may be utilized with a controller of a storage system storing an outstanding update operation L2P cache or cache that logs updates made to a host L2P table, such as the OUO cache 226 of FIG. 2.

In operation 602, the controller of the storage device updates the OUO cache in response to a region of a host L2P table being updated. A host L2P table, such as the host L2P cache 228 of FIG. 2, is a host memory based cache stored in a host device. The host L2P table may be comprised of cache regions, with each cache region having a version indicator for the region and a plurality of cache entries. The cache entries within each cache region may log a logical address to a physical address. A single management operation, which alters a single cache entry, may require the system to invalidate and later update whole cache regions of the host L2P table. The host device may not use the cache region until it is completely updated. Thus, as data is relocated, the physical address corresponding to a logical address of the relocated data changes, and the update may be logged in the OUO cache stored in the controller of the storage device while the corresponding region in the host L2P is being updated. The controller may log all of the cache entries of the region being updated to the OUO cache. The controller may also log only the updated cache entries within the region being updated to the OUO cache. The controller may update the OUO cache after relocating the data. In one embodiment, the controller receives a command from the host device to update the OUO cache. The OUO cache may further comprise a version indicator for the cache entries.

In operation 604, the controller receives a command to read data. The command may also be a write command, in which case method 600 would proceed in the same manner. When a host device sends a command to read or write data, the host device may optionally include the physical address and the logical address associated with the data, as stored in the host L2P table.

In operation 606, the controller determines whether a current physical address of the data was sent with the read command. The host device may send a physical address associated with the data to the storage device with the read command, such as by sending the storage device the cache region of the host L2P table corresponding to the logical address of the data to the physical address. However, if the cache region is currently being updated, the information in the cache region may not be current. In one embodiment, no cache entries in the host L2P table are invalidated while being updated. A cache region of the host L2P table currently being updated may be received by the controller with some outdated information. The controller will read a version indicator of the cache region to determine whether the information logged in the cache entries of the cache region is outdated.

If the version indicator indicates that the cache region is current, and thus the physical address received with the command is current, method 600 proceeds to operation 608. In operation 608, the controller reads the data from the location corresponding to the current physical address received with the command. The controller may read the data without searching for the location of the data in a controller L2P cache or a master L2P table stored in flash memory.

If the command was sent with an outdated physical address or was sent without a physical address, method 600 proceeds to operation 610. In operation 610, the controller reads a portion of the host L2P table associated with the data and a portion of the outstanding update operation L2P cache associated with the data to determine a location of the data.

As only some cache entries in a cache region may have changed or been updated, other cache entries will still be current, and some information logged in the cache region will be up-to-date. Thus, the controller may read the cache region of the host L2P table sent with the command to determine the location of data logged in cache entries corresponding to current physical addresses. The controller will then read the OUO cache to determine the location of data corresponding to physical addresses being updated in the cache region. Thus, the controller may read an outdated version of the cache region and an updated version in the OUO cache to determine the location of the data.

By not invalidating cache entries in controller L2P caches when relocating data, cache coherency issues may be reduced or eliminated and the overall read performance may be improved. Keeping multiple copies of data or information in the controller L2P caches reduces the amount of processing required for data relocation activities, and permits for simpler non-intrusive methods for updating the controller L2P caches to be implemented. Additionally, the life of memory blocks may be increased, as memory blocks may be selected for erasure based on the version indicator of the L2P cache.

In one embodiment, a method of operating a storage device having a plurality of memory blocks comprises relocating data stored in a first memory block to a second memory block, receiving a request to read the data, reading a logical to physical table to determine which memory block of the plurality of memory blocks the data is stored in, and reading the data from either the first memory block or the second memory block. A controller of the storage device is capable of reading the first memory block and the second memory block after relocating the data.

The logical to physical table may be stored in the controller. The logical to physical table may be compressed. The method may further comprise updating the logical to physical table in response to relocating the data stored in the first memory block to the second memory block. Updating the logical to physical table may comprise incrementing a version indicator of a first cache entry in the logical to physical table. A first physical address associated with the first memory block may be logged in the first cache entry to the data. Updating the logical to physical table m ay comprise adding one or more cache entries to the logical to physical table. The one or more cache entries may log a second physical address associated with the second memory block to the data.

In another embodiment, a method of operating a storage device comprises relocating data from a first memory block associated with a first physical address to a second memory block associated with a second physical address. The first physical address is logged in a first cache entry in a compressed logical to physical table. The method further comprises incrementing a version indicator of the first cache entry in the compressed logical to physical table, adding one or more updated cache entries to the compressed logical to physical table in response to relocating the data to the second physical address, searching the compressed logical to physical table to determine where the data is located, reading the first cache entry before reading the one or more updated cache entries, and reading the data from the first physical address.

The method may further comprise scheduling the first memory block to be erased and decrementing the version indicator of the first cache entry in the compressed logical to physical table in response to scheduling the first memory block to be erased. The first cache entry in the compressed logical to physical table may remain valid until the version indicator is decremented. The compressed logical to physical table may be stored in a controller of the storage device. The compressed logical to physical table may be searched in response to receiving a command to read or write data. The one or more updated cache entries may comprise a second cache entry corresponding to the relocation of the data to the second memory block. The first cache entry and the second cache entry both may be valid cache entries in the compressed logical to physical table. The version indicator of the first cache entry may indicate that information logged in the first cache entry is an outdated version of the information logged in the second cache entry.

In one embodiment, a storage device comprises a plurality of memory blocks. Each memory block of the plurality of memory blocks comprises flash memory units. The storage device further comprises a controller coupled to the plurality of memory blocks. The controller is configured to store a compressed logical to physical table. The compressed logical to physical table logs location of data to one or more of the plurality of memory blocks. The controller is further configured to sort a validity counter array by a validity count. The validity count is a number of valid flash memory units in a memory block. The controller is further configured to prioritize one or more memory blocks from the plurality of memory blocks to be erased. Memory blocks having a low validity count are prioritized above memory blocks having a high validity count. Memory blocks not logged to data in the compressed logical to physical table are prioritized above memory blocks that are logged to data in the compressed logical to physical table. The controller is further configured to schedule one or more memory blocks from the plurality of memory blocks to be erased in order of priority.

Memory blocks not recently read in the compressed logical to physical table may be prioritized above memory blocks that have been recently read in the compressed logical to physical table. Memory blocks having a low validity count may be prioritized above memory blocks not logged to data in the compressed logical to physical table. Memory blocks not logged to data in the compressed logical to physical table may be prioritized above memory blocks not recently read in the compressed logical to physical table. The controller may be further configured to group memory blocks by validity count before prioritizing the one or more memory blocks from the plurality of memory blocks to be erased. The controller may be further configured to store an outstanding update operation table, wherein the outstanding update operation table logs updates made to the compressed logical to physical table.

While the foregoing is directed to embodiments of the present disclosure, other and further embodiments of the disclosure may be devised without departing from the basic scope thereof, and the scope thereof is determined by the claims that follow.

What is claimed is:

1. A method of operating a storage device having a plurality of memory blocks, comprising:
    relocating data stored in a first memory block to a second memory block;
    receiving a request to read the data;
    reading a first logical to physical table configured to convert logical addresses to physical addresses to determine which memory block of the plurality of memory blocks the data is stored in, wherein the first logical to physical table logs most recently read and written data to the plurality of memory blocks; and
    reading the data from either the first memory block or the second memory block, wherein a controller of the storage device is capable of reading the first memory block and the second memory block after relocating the data, and wherein the storage device comprises a master logical to physical table configured to convert logical addresses to physical addresses and that logs all read, written, and erased data from the plurality of memory blocks.

2. The method of claim 1, wherein the first logical to physical table is stored in the controller, and wherein the master logical to physical table is stored in one or more memory blocks of the plurality of memory blocks.

3. The method of claim 2, wherein the first logical to physical table is compressed.

4. The method of claim 1, further comprising:
    updating the first logical to physical table in response to relocating the data stored in the first memory block to the second memory block.

5. The method of claim 4, wherein updating the first logical to physical table comprises incrementing a version indicator of a first cache entry in the first logical to physical table, wherein a first physical address associated with the first memory block is associated with the first cache entry to the data.

6. The method of claim 4, wherein updating the first logical to physical table comprises adding one or more cache entries to the first logical to physical table, wherein the one or more cache entries log a second physical address associated with the second memory block to the data such that multiple data entries in the cache are associated with the second memory block.

7. A method of operating a storage device, comprising:
    relocating data from a first memory block associated with a first physical address to a second memory block associated with a second physical address, wherein the first physical address is logged in a first cache entry in a compressed logical to physical table configured to convert logical addresses to physical addresses, wherein the compressed logical to physical table logs most recently read and written data to the memory blocks, and wherein the storage device comprises a master logical to physical table configured to convert logical addresses to physical addresses and that logs all read, written, and erased data from the memory blocks;
    incrementing a version indicator of the first cache entry in the compressed logical to physical table;
    adding one or more updated cache entries to the compressed logical to physical table in response to relocating the data to the second physical address;
    searching the compressed logical to physical table to determine where the data is located;
    reading the first cache entry before reading the one or more updated cache entries; and
    reading the data from the first physical address.

8. The method of claim 7, further comprising:
    scheduling the first memory block to be erased; and
    decrementing the version indicator of the first cache entry in the compressed logical to physical table in response to scheduling the first memory block to be erased.

9. The method of claim 8, wherein the first cache entry in the compressed logical to physical table remains valid until the version indicator is decremented.

10. The method of claim 7, wherein the compressed logical to physical table is stored in a controller of the storage device.

11. The method of claim 7, wherein the compressed logical to physical table is searched in response to receiving a command to read or write data.

12. The method of claim 7, wherein the one or more updated cache entries comprise a second cache entry corresponding to the relocation of the data to the second memory block.

13. The method of claim 12, wherein the first cache entry and the second cache entry both are valid cache entries in the compressed logical to physical table.

14. The method of claim 13, wherein the version indicator of the first cache entry indicates that information logged in the first cache entry is an outdated version of the information logged in the second cache entry.

15. A storage device, comprising:
a plurality of memory blocks, wherein each memory block of the plurality of memory blocks comprises flash memory units;
a master logical to physical table configured to convert logical addresses to physical addresses and that logs all read, written, and erased data from the plurality of memory blocks; and
a controller coupled to the plurality of memory blocks, wherein the controller is configured to:
store a compressed logical to physical table configured to convert logical addresses to physical addresses, wherein the compressed logical to physical table logs location of most recently read and written data to one or more of the plurality of memory blocks;
sort a validity counter array by a validity count, wherein the validity count is a number of valid flash memory units in a memory block;
prioritize one or more memory blocks from the plurality of memory blocks to be erased, wherein memory blocks having a low validity count are prioritized above memory blocks having a high validity count, and wherein memory blocks not logged to data in the compressed logical to physical table are prioritized above memory blocks that are logged to data in the compressed logical to physical table; and
schedule one or more memory blocks from the plurality of memory blocks to be erased in order of priority.

16. The storage device of claim 15, wherein memory blocks not recently read in the compressed logical to physical table are prioritized above memory blocks that have been recently read in the compressed logical to physical table.

17. The storage device of claim 16, wherein memory blocks having a low validity count are prioritized above memory blocks not logged to data in the compressed logical to physical table.

18. The storage device of claim 17, wherein memory blocks not logged to data in the compressed logical to physical table are prioritized above memory blocks not recently read in the compressed logical to physical table.

19. The storage device of claim 15, wherein the controller is further configured to group memory blocks by validity count before prioritizing the one or more memory blocks from the plurality of memory blocks to be erased.

20. The storage device of claim 15, wherein the controller is further configured to store an outstanding update operation table, wherein the outstanding update operation table logs updates made to the compressed logical to physical table.

* * * * *